(12) United States Patent
Berenz et al.

(10) Patent No.: US 12,180,659 B2
(45) Date of Patent: Dec. 31, 2024

(54) PIVOT-STEERED TANDEM ROLLER AND METHOD FOR OPERATING SUCH ROLLERS

(71) Applicant: BOMAG GMBH, Boppard (DE)

(72) Inventors: Andreas Berenz, Boppard (DE); Hagen Brenner, Boppard (DE); Anna Theresa Christ, Boppard (DE); Michael Perscheid, Boppard (DE); Daniel Roos, Boppard (DE); Tobias Kreutz, Boppard (DE)

(73) Assignee: BOMAG GMBH, Boppard (DE)

( * ) Notice: Subject to any disclaimer, the term of this patent is extended or adjusted under 35 U.S.C. 154(b) by 771 days.

(21) Appl. No.: 17/443,835

(22) Filed: Jul. 28, 2021

(65) Prior Publication Data
US 2022/0034047 A1 Feb. 3, 2022

(30) Foreign Application Priority Data
Jul. 29, 2020 (DE) ...................... 10 2020 004 615.0

(51) Int. Cl.
*E01C 19/26* (2006.01)
(52) U.S. Cl.
CPC .................................... *E01C 19/26* (2013.01)
(58) Field of Classification Search
CPC ..................................................... E01C 19/26
See application file for complete search history.

(56) References Cited

U.S. PATENT DOCUMENTS

| | | | | |
|---|---|---|---|---|
| 3,868,194 A * | 2/1975 | Ferguson | ................ | E01C 19/26 180/323 |
| 3,947,142 A * | 3/1976 | Takata | .................... | E01C 19/26 404/126 |
| 4,046,485 A * | 9/1977 | Dermond | ................ | E01C 19/26 180/417 |
| 4,260,280 A * | 4/1981 | Hirn | ..................... | B62D 21/186 296/193.03 |
| 4,266,884 A * | 5/1981 | Tuneblom | ............... | E01C 19/26 180/20 |
| 5,337,833 A * | 8/1994 | Rizzo | ..................... | A01G 20/35 172/520 |
| 2001/0007292 A1* | 7/2001 | Yabf | ........................ | F01P 11/12 180/68.1 |

(Continued)

FOREIGN PATENT DOCUMENTS

| | | |
|---|---|---|
| DE | 2634672 | 3/1977 |
| DE | 29620847 | 1/1997 |

(Continued)

*Primary Examiner* — Abigail A Risic
(74) *Attorney, Agent, or Firm* — Grossman, Tucker, Perreault & Pfleger, PLLC (57) ABSTRACT

A pivot-steered tandem roller for ground compaction, comprising a machine frame with an operator platform, two compaction drums which are spaced apart from one another in the longitudinal direction of the machine and are each steerably mounted on the machine frame via a pivot steering system, a drive motor, a cooler, and a fan associated with the cooler and conveying a cooling air flow, the cooler being arranged vertically above and/or in the longitudinal direction of the machine at the level of one of the compaction drums. Moreover, the invention relates to a method for operating such a pivot-steered tandem roller.

16 Claims, 4 Drawing Sheets

(56) References Cited

U.S. PATENT DOCUMENTS

| | | | |
|---|---|---|---|
| 2004/0062608 A1* | 4/2004 | Auf der Springe | B60N 2/14 |
| | | | 404/122 |
| 2010/0071870 A1* | 3/2010 | Kisse | F01P 5/06 |
| | | | 165/51 |
| 2012/0045281 A1* | 2/2012 | Wagner | B62D 12/00 |
| | | | 404/117 |
| 2013/0305717 A1* | 11/2013 | Roehr | E02D 3/032 |
| | | | 60/605.2 |
| 2014/0044483 A1* | 2/2014 | Kreutz | E01C 19/23 |
| | | | 404/126 |
| 2019/0017232 A1* | 1/2019 | Zhao | B62D 25/082 |

FOREIGN PATENT DOCUMENTS

| | | |
|---|---|---|
| GB | 1521835 | 8/1978 |
| JP | 2019039255 A | 3/2019 |

\* cited by examiner

PIVOT-STEERED TANDEM ROLLER AND METHOD FOR OPERATING SUCH ROLLERS

FIELD

The invention relates to a pivot-steered tandem roller for ground compaction and a method for operating such a tandem roller.

BACKGROUND

Generic tandem rollers are used for ground compaction, particularly in road and path construction and in the construction of squares and runways. In particular, they are typically used for compacting asphalt. Tandem rollers typically comprise a machine frame with an operator platform that includes a cab to protect the roller's driver as well as corresponding control elements. In addition, generic tandem rollers typically comprise two compaction drums spaced apart in the longitudinal direction of the machine, which are commonly referred to as drums. The compaction drums are in particular cylindrical steel drums which have, for example, smooth or structured outer jacket surfaces. Typically, one compaction drum is located at the front as viewed in a forward direction, and another compaction drum is located at the rear as viewed in this forward direction. The operator platform is usually located between said rolls. One or more compaction drums may also be of split configuration. In the present context, a compaction drum thus refers to an assembly rotating about a common rotation axis. The compaction drums are each rotatably and steerably mounted on the machine frame via a pivot steering system. In the present case, a pivot steering system means that the compaction drums are configured to rotate, via a turntable, about a vertical steering axis which passes through the compaction drum and in particular intersects the rotation axis of the compaction drum about which the compaction drum rotates for rolling on the outer jacket surface as the tandem roller advances. To enhance the compaction effect, one or both of the compaction drums may additionally be set into vibration during operation via an imbalance exciter, for example a vibration or oscillation exciter. In addition, it is known to wet the compaction drums with a liquid, such as water, during operation to reduce or prevent ground material from sticking to the compaction drums. Consequently, generic tandem rollers usually also have at least one liquid tank to hold the corresponding liquids, in particular water, available during operation. A drive motor, which is for example a diesel combustion engine, is typically used to supply generic tandem rollers with energy. In order to counteract the generation of heat during working operation of the tandem roller and/or to increase the efficiency of the operation, these rollers usually also have a cooler, for example a hydraulic liquid cooler and/or a coolant cooler and/or a charge air cooler. A fan conveying a flow of cooling air is associated with this cooler, which conveys cooling air through the cooler and thereby achieves cooling of the medium contained in the cooler.

In conventional pivot-steered tandem rollers, the cooler and the fan associated with the cooler are typically located in the engine compartment under the operator platform, where the drive motor is also located, or at least in the immediate vicinity of the engine compartment. Ever stricter emissions legislation has resulted in changes to engines and exhaust gas aftertreatment components over the years. For example, ever larger and/or an ever greater number of components, such as SCR systems, must be placed in the machines, since most diesel combustion engines of sufficient power nowadays must be equipped with exhaust gas aftertreatment to reduce nitrogen oxide emissions. This has also caused increased demands on cooling capacity, requiring larger coolers and/or a more efficient cooling concept. To compensate for the existing and often already very confined space conditions in the engine compartment of a generic tandem roller, it is then necessary to gain space by reducing or downsizing other components. In many cases, for example, the volumes of the water tanks for wetting the compaction drums are reduced. However, this naturally means that the water tanks have to be refilled more often when the roller is in operation, which leads to delays in the work process and higher costs. If, on the other hand, the coolers are not configured large enough due to a lack of space, the work efficiency of the entire machine will drop.

SUMMARY

The object of the present invention is to optimize the operation of a generic tandem roller and, in particular, to enable particularly effective cooling air management.

The object is achieved with a tandem roller and a method according to the independent claims. Preferred embodiments are cited in the dependent claims.

Specifically, in a generic pivot-steered tandem roller as mentioned above, the object is achieved by arranging the cooler vertically above and/or in the longitudinal direction of the machine at the level of one of the compaction drums. It is particularly preferred that the cooler is arranged both vertically above and in the longitudinal direction of the machine at the level of one of the compaction drums. In these spatially confined areas of the tandem roller, which usually include, among other things, the steering joints of the pivot steering system, the available installation space can be used to accommodate at least one cooler. This means spatial separation from the drive motor, which is usually arranged underneath the driver's cab. However, this can be tolerated in view of the advantages gained. Thus, the basic idea of the invention is to relocate the cooler from the engine compartment, which is typically located in the center of the machine underneath the operator platform, to another machine compartment associated with one of the compaction drums. The cooler is therefore located outside the engine compartment. In this manner, on the one hand, installation space is gained in the engine compartment that can be used for additional components, such as an exhaust gas aftertreatment system (e.g. SCR: "selective catalytic reduction"). On the other hand, the cooler, which also requires space, is relocated to a region of the tandem roller where it can be dimensioned with the necessary size without having to significantly restrict other machine components in terms of size and their associated efficiency. Such an arrangement of the cooler has been avoided so far, since it may in particular necessitate relatively long and complex cooling air routing extending through large parts of the machine. This applies in particular if effects of the cooling air management on the external environment, for example due to stirred up dust etc., are to be avoided. As will be explained in more detail below, in preferred embodiments of the invention it has even been realized that further advantages may be gained from the cooling air routing per se.

In the present context, the terms "vertically"/"vertical direction" are used to mean a direction perpendicular to a flat, horizontal ground on which the tandem roller is standing. The longitudinal direction of the machine is the horizontal direction usually referred to as the forward or reverse direction, especially during normal traveling operation of the tandem roller when driving straight ahead. In this case, the rotation axes of the compaction drums are perpendicular to the longitudinal axis of the machine in the horizontal plane. In particular, the longitudinal direction of the machine is parallel to a flat ground on which the tandem roller is standing. If the tandem roller is operated in crab steering mode, the longitudinal direction of the machine is oblique to the forward direction. The fact that the cooler is located vertically above one of the compaction drums means that a projection of the contours of the compaction drum and the cooler at least partially overlap in vertical direction. The fact that the cooler is arranged at the level of one of the compaction drums in the longitudinal direction of the machine means that the contours of the compaction drum and the cooler at least partially overlap in a projection transverse to the longitudinal direction of the machine.

In the case of the pivot steering system, the compaction drums are steerable by means of a turntable rotatably mounted on the machine frame. The turntable is therefore positioned vertically above the compaction drum and centrally at the rear or front of the machine or at the first or second steering section, as will be explained in more detail below. Above the turntable, the present invention can open up installation space for accommodating the cooler, which is why it is preferred that the cooler is arranged in vertical direction not only above a turntable but above a turntable of the pivot steering system of one of the compaction drums.

Generally, the cooler may be configured to cool any operating medium of the tandem roller. For example, the cooler may be configured as a hydraulic liquid cooler, a coolant cooler or a charge air cooler. However, it is preferred that the cooler cools several operating media of the tandem roller simultaneously (combination cooler) or is part of a cooler package consisting of several individual coolers. In other words, it is preferred that the cooler is configured as a cooler package and comprises at least two, in particular all three, of the following coolers: A hydraulic liquid cooler, a coolant cooler, and/or a charge air cooler. Since not all modern diesel engines require a charge air cooler, it is particularly preferred that the cooler configured as a cooler package comprises, for example, a hydraulic liquid cooler and a coolant cooler.

To enhance the cooling effect of the cooler, a fan is associated with the cooler to convey a cooling air flow which is passed through the cooler. The fan is therefore configured, for example, as an air conveying fan. Overall, the fan associated with the cooler thus supplies cooling air to the cooler. They are thus functionally related to each other. As a result, it may be preferred for the cooler and fan to be located in spatial proximity to each other. Therefore, similar to the cooler, the fan associated with the cooler may, for example, be arranged vertically above and/or in the longitudinal direction of the machine at the level of one of the compaction drums, i.e. in the same machine compartment. In this embodiment, the fan is thus still in close spatial proximity to the cooler. In particular, the fan is located in the same compartment of the machine or in the same machine compartment. This results in a particularly short flow path between the fan and the cooler, which contributes to efficient cooling. Alternatively, the fan may be arranged at a power take-off of the drive motor. In this embodiment, the fan is thus arranged in spatial proximity to the drive motor, for example still in the engine compartment. The fan and the cooler are therefore generally physically separated from each other in this case, as the cooler is located outside the engine compartment. In this manner, both the installation space in the engine compartment and the installation space outside the engine compartment can be optimally used to accommodate the cooling components. The fan may be arranged downstream of the cooler in the flow direction of the cooling air, so that it draws cooling air through the cooler. Alternatively, the fan may be arranged upstream of the cooler in the flow direction of the cooling air, so that it blows cooling air through the cooler. Depending on the space requirements of other components in the immediate vicinity of the fan and the cooler, one way or the other may lead to an optimized utilization of installation space. Generally, the fan may be driven in different ways. For example, the fan may have a separate, dedicated fan drive associated with it, such as a hydraulic fan drive or an electric fan drive. By using a separate fan drive, the fan can be placed particularly flexibly. Alternatively, especially if the fan is arranged in the region of the power take-off of the drive motor, it may also be driven by a power take-off of the drive motor, especially via a belt drive. Direct drive of the fan via a power take-off of the drive motor is often particularly energy-efficient.

As far as their machine and functional areas are concerned, pivot-steered tandem rollers are almost symmetrical in the longitudinal direction of the machine. Thus, three parts in particular can be distinguished: A first, front steering section including the first compaction drum, a second, rear steering section including the second compaction drum, and a drive and control section between the two steering sections, the drive and control section typically comprising the operator platform and the engine compartment with the drive motor arranged below the operator platform. However, the steering sections also comprise encased machine compartments in which components of the tandem roller may be housed. Thus, in the longitudinal direction of the machine, both in front of and behind the operator platform, there may be a machine compartment which is at least partially encased by a cover and/or the machine frame, i.e. essentially enclosed, and which belongs in particular to the respective steering section and is located in particular vertically above one of the compaction drums in each case. The cover may, for example, comprise a hood, for example made of plastic, which may, for example, be configured to swivel to provide access to the respective machine compartment. The cover delimits the machine compartment, for example, vertically upwards and/or transversely to and/or in the longitudinal direction of the machine. It is possible, for example, that the cover constitutes a part of the outer skin or outer contour of the tandem roller. Both steering sections may each have such a cover and a machine compartment at least partially encased by the cover. The covers may, for example, be configured such that they slope in vertical direction downward in the direction away from the operator platform in order to give the operator a better view of the ground ahead of or behind the tandem roller from the operator platform. According to a preferred embodiment of the invention, the front cover and/or the rear cover have ventilation openings on their vertically upper side for the cooling air flow conveyed by the fan. The ventilation openings may be configured or used, for example, for the entry of cooling air from the outside environment of the tandem roller into the machine compartment or for the exit of cooling air from the machine compartment to the outside environment of the tandem roller. It is particularly preferred that both the front cover and the rear cover each have such ventilation openings, the ventilation openings of one cover being configured for the entry and the ventilation openings of the other cover being configured for the exit of the cooling air. Due to the arrangement of the ventilation openings on the vertically upper side of the cover, the air drawn in is drawn in comparatively far away from the underlying ground, so that less dust is drawn into the machine with the cooling air. Likewise, blowing out the cooling air on the vertically upper side of the cover ensures that the blown-out air does not stir up dust.

In particular, the cooler according to the invention is located in one of the machine compartments above the steering sections or the turntables. For example, the cooler may be located in the front machine compartment or in the rear machine compartment. In a preferred embodiment, the fan associated with the cooler is also located in one of the machine compartments above the steering sections or a turntable, for example in the front machine compartment or the rear machine compartment. The cooler and the fan may be located in different machine compartments. For this arrangement, it is preferred in particular to position the fan in the front machine compartment above the front compaction drum and the at least one cooler in the rear machine compartment above the rear compaction drum. It is particularly preferred if the cooler and the fan associated with the cooler are both arranged in the same, in particular the rear, machine compartment, i.e. in the machine compartment above the rear compaction drum.

In particular in cases where the cooler and the fan are not located in the same machine compartment but in different machine compartments, a flow channel is provided which connects the two machine compartments of the steering sections, i.e. the front and the rear machine compartment, through the engine compartment in the drive and control section of the tandem roller. However, such a flow channel may also be provided if the fan and the cooler are located in the same machine compartment. In particular, it is preferred that a flow channel is provided which is configured such that the cooling air flow conveyed by the fan is conveyed from the outside environment of the tandem roller into the front machine compartment. From there, the cooling air flow is then conveyed vertically downward and rearward into the engine compartment located below the operator platform. The cooling air flow is then guided essentially horizontally through the engine compartment and from there is conveyed vertically upward and rearward into the rear machine compartment. From the rear machine compartment, the cooling air flow is then blown out into the outside environment of the tandem roller. This type of cooling air routing in combination with the positioning of the cooler according to the invention, as described above, enables particularly efficient cooling air routing, improves the cooling efficiency compared to conventional systems and thus allows, among other things, comparatively environmentally friendly operation. However, the conveying direction may generally also be reversed, so that the cooling air flow is conveyed from the outside environment via the rear machine compartment, the engine compartment, then the front machine compartment and back into the outside environment. At one point of the flow channel, the cooling air flow passes through the cooler.

The cooling air flow now preferably flows through the cooler in an at least partially upward direction, in particular with respect to the longitudinal direction of the machine in an ascending and obliquely rearward manner. The cooler, which is usually configured as an essentially cuboidal body with two opposing, substantially planar flow areas (cooling air inlet and cooling air outlet), is thus preferably positioned in an oblique position. "Oblique position" refers to an arrangement in which the planes of the flow areas are at an angle to or intersect a vertical line. The oblique position of the cooler is selected such that the cooler ascends in the longitudinal direction of the machine toward the driver's cab and slopes down in the direction away from the driver's cab. The region of the cooler further away from the driver's cab is therefore vertically lower than the region of the cooler facing the driver's cab.

It is now preferred to select the oblique position of the cooler such that the flow direction of the cooling air flow conveyed through the cooler by the fan deviates less from the vertical direction than from the horizontal direction. For example, the flow direction should deviate from the vertical direction by a maximum of 40°, preferably by a maximum of 30°, more preferably by a maximum of 20° and particularly preferably by a maximum of 10°. This allows the plane of the main extension of the cooler to approach the horizontal in an appropriate manner. This allows the cooler to be arranged in a particularly space-saving manner below the cover of the machine compartments of the steering sections of the tandem roller while at the same time providing optimized visibility. The preferred upward flow direction also leads to other advantages, which are described in more detail below.

As mentioned at the beginning, generic tandem rollers typically have liquid tanks, especially water tanks, which are used to wet the compaction drums to prevent the material to be compacted from sticking. In order to ensure that the center of gravity of the machine is as low as possible despite the additional weight of the liquid tanks, the liquid tanks are preferably arranged in the region of the engine compartment or at least below the operator platform at the drive and control section of the tandem roller. At the same time, accessibility to the engine compartment for maintenance work must be ensured. According to a preferred embodiment, it is therefore particularly advantageous if the engine compartment is limited on both sides transversely to the longitudinal direction of the machine by a respective engine compartment door, the engine compartment doors each having a liquid tank, preferably for storing water for the irrigation system. The liquid tank is configured to swivel with the respective engine compartment door, i.e. is arranged on the latter. The liquid tanks are therefore located opposite each other on the respective machine sides transversely to the longitudinal direction of the machine. In particular, the cooling air flow conveyed by the fan may be passed through between the two liquid tanks, with the cooler being arranged outside the region between the two liquid tanks. The flow channel through the engine compartment requires significantly less space as long as the cooler is not also arranged in the engine compartment. In this manner, therefore, the liquid tanks can be supplied with sufficient volume for a long operating time without filling. At the same time, the cooling capacity of the cooler is not impaired, since it is located in a different machine compartment outside the engine compartment. In particular in the case where one, several or, in particular, all of the liquid tanks of the tandem roller are arranged in the drive and control section, for example in the engine compartment, and the cooler is arranged in one of the steering sections, for example in one of the machine compartments, the invention leads to an advantageous utilization of the installation space.

Generally, it is sufficient if the cooling air is sucked in through the ventilation openings in one of the covers. However, the cooling air passed through the tandem roller is not only heated in the cooler but also by the drive motor in the engine compartment, for example. It may therefore be advantageous to once again introduce fresh cooling air into the flow channel, for example behind the engine compartment or downstream of the engine compartment as seen in the flow direction of the cooling air. For this purpose, according to a preferred embodiment, an intake duct, in particular an additional intake duct, is arranged between the operator platform and the ventilation openings through which the cooling air flow conveyed by the fan exits into the outside environment of the tandem roller, through which air is drawn in from the outside environment of the tandem roller and is added to the cooling air flow. The intake duct may, for example, also be arranged in the cover or any other component of the tandem roller, in particular in a region between the driver's cab and the region of the cover facing the driver's cab. Air from the outside environment of the tandem roller which has not yet been heated by the engine is drawn in through the intake duct. This air drawn in through the intake duct is preferably directed into the flow channel and to the cooler in a manner bypassing the engine compartment. In this preferred manner, a mixture of cooling air that has passed through the engine compartment and cooling air that has not passed through the engine compartment flows through the cooler. Particularly when the cooling air is strongly heated by the drive motor in the engine compartment, the intake duct significantly supports cooling efficiency. Generally, it is also possible to implement the cooling air flow used for cooling the cooler such that it completely bypasses the engine compartment, in particular by using a cooling air inlet in the longitudinal direction of the machine in the region of the cover covering the cooler or in the region of the machine in front of or behind the driver's cab in the longitudinal direction of the machine in which the cooler is arranged. It is also possible to arrange the cooling air inlet between the driver's cab and the cover covering the cooler. Generally, the invention thus comprises an arrangement in which, in particular in a manner bypassing the engine compartment, both the cooling air inlet and the cooling air outlet are arranged in the front or the rear machine section, particularly preferably formed in each case by said one cover.

As has already been explained, it is advantageous if the cooling air flow passes through the cooler in an at least partially upward direction. It is now particularly advantageous if the cooler is arranged such that the cooling air flow conveyed by the fan flows through it in an oblique upward direction and away from the operator platform. In particular, the ventilation openings through which the cooling air flow conveyed by the fan exits into the outside environment of the tandem roller may preferably also be configured such that the cooling air flow conveyed by the fan is directed in an oblique upward direction and away from the operator platform when exiting through the ventilation openings. Both the arrangement of the cooler and the configuration of the ventilation openings thus ensure that the cooling air or cooling air flow is directed in the same direction, in this case preferably in an oblique upward direction and away from the operator platform. For this purpose, guide vanes are arranged in the cooler or at the ventilation openings of the cover, for example, which direct or deflect the air flow accordingly. In this manner, the cooling air flow can be directed with particularly little resistance, which lowers the required power of the fan. At the same time, the direction of the exiting cooling air flow away from the operator platform ensures that the strongly heated cooling air coming from the inside of the tandem roller is distributed in the outside environment and does not negatively affect the operator of the tandem roller. This prevents hot cooling exhaust air from entering even when the driver's cab window is open.

The exiting cooling air flow or the targeted arrangement and/or routing of the exiting cooling air flow may be further advantageously configured and integrated into the present system. For example, the exiting cooling air flow may form a flow carpet or flow curtain directed upward and away from the operator platform, which prevents exhaust gases of the tandem roller from reaching the operator platform. In particular, the cooling air flow may be directed, for example by means of an appropriate arrangement and configuration of the cooling air outlet and/or by means of supplementary guide devices such as guide vanes, in such a manner that it at least partially captures the exhaust gases of the tandem roller and carries them away from the operator platform. For this purpose, the ventilation openings through which the cooling air flow conveyed by the fan exits into the outside environment of the tandem roller and a tail pipe of an exhaust gas system of the drive motor are arranged on the same cover, and that the ventilation openings are arranged at least partially closer to the operator platform than the tail pipe. The cooling air exit openings are thus positioned in the cover in the longitudinal direction of the machine between the exhaust gas outlet of the tail pipe and the driver's cab. The tail pipe refers to the pipe socket from which the exhaust gases of the exhaust gas system escape ("exhaust pipe"). The tail pipe is located further away from the operator platform than at least part of the ventilation openings through which the cooling air flow exits. In this manner and with the previously described flow direction of the cooling air, the result is that the cooling air captures the exhaust gases and at least partially entrains them or at least counteracts a flow of exhaust gases toward the driver's cab. This works particularly well when an exhaust gas aftertreatment system, such as an SCR system, is used. In this case, a rear muffler can be dispensed with, allowing the tail pipe to be configured as a particularly short tail pipe stub. Preferably, the tail pipe stub is arranged such that it does not project vertically beyond the top edge of the cover or does not completely protrude beyond the cooling air outlet openings in the cover in vertical direction, which is particularly important in the case of a cover sloping downward in a direction away from the driver's cab. Generally, it is preferred if the tail pipe does not protrude beyond the cover by more than 30 cm, preferably not more than 20 cm, and particularly preferably not more than 15 cm. The exit opening of the tail pipe is preferably arranged vertically below or at a maximum at the same height as the ventilation openings from which the cooling air exits. It is also particularly advantageous if the tail pipe stub is configured such that the exhaust gases also exit the outlet of the tail pipe in an oblique upward direction and away from the operator platform. According to another particularly advantageous embodiment, the tail pipe is surrounded by the ventilation openings through which the cooling air flow escapes, thus ensuring particularly reliable capturing of the exhaust gas flow by the cooling air flow. For example, if the ventilation openings are configured as a sieve-shaped metal sheet, the tail pipe may penetrate this sheet in the center.

Further, the cooler and the fan can generally be arranged relative to each other in such a way that the fan sucks or pushes the cooling air through the cooler.

The aforementioned object is also solved by a method for operating a pivot-steered tandem roller, in particular a tandem roller according to the preceding embodiments, to which reference is hereby made in addition. The same modifications, features, effects and advantages apply mutatis mutandis to the method according to the invention as have been described for the tandem roller according to the invention, and vice versa. Merely to avoid repetition, reference is made to the above explanations regarding the tandem roller. Specifically, the method according to the invention comprises the steps of: drawing cooling air from the outside environment of the tandem roller into a front or rear machine compartment; directing the cooling air downward into an engine compartment and along the longitudinal direction of the machine; directing the cooling air upward into the respective other front or rear machine compartment; passing the cooling air through a cooler arranged in the front or rear machine compartment; and blowing out the cooling air into the outside environment of the tandem roller. Flowing through the cooler in the front or rear machine compartment instead of in the engine compartment as is common in the prior art results in the advantages according to the invention in that the space requirement of the cooler in one of the machine compartments can be optimally covered without negatively affecting the size of other components. The cooling air flow is directed and guided by the flow channel already described above.

A preferred modification of the method according to the invention is characterized by drawing in cooling air through an intake duct between an operator platform and ventilation openings through which the cooling air flow conveyed by the fan exits into the outside environment of the tandem roller. Via the intake duct, an independent, separate cooling air circuit can also be created which leads, for example, via the intake duct, through the machine compartment arranged on this side of the tandem roller, there through the cooler, and then through the ventilation openings of the cover of the machine compartment to the outside environment. In this manner, this separate cooling air circuit would bypass the engine compartment and provide increased cooling efficiency at the cooler.

It is also preferred for the method that the drawing in and blowing out of the cooling air, as well as the flow through the cooler, already take place, to the extent possible, in the direction in which the cooling air flow is directed at the respective point in order to achieve the lowest possible flow resistance. It is therefore preferred that the cooling air is drawn in obliquely downward and/or the cooling air flows through the cooler obliquely upward and/or the cooling air is blown out obliquely upward and away from the operator platform. The corresponding orientation of the components involved, in particular the cooler and the fan, also saves installation space.

In order to keep the exhaust gas flow of the drive motor away from the operator platform and the driver of the tandem roller, it is further preferred that the cooling air is blown out into the outside environment of the tandem roller in such a manner that the cooling air flow is directed towards a tail pipe of an exhaust gas system of the drive motor. In particular, both the cooling air flow and the exhaust gas flow from the tail pipe are blown out in the same direction, with the cooling air flow being blown out at least partially closer to the operator platform than the exhaust gas flow. In other words, the cooling air flow and the exhaust gas flow are merged in the outside environment of the tandem roller, more specifically in an oblique upward direction and away from the operator platform.

BRIEF DESCRIPTION OF THE DRAWINGS

The invention will be explained in more detail below by reference to the embodiment examples shown in the figures. In the schematic figures.

DETAILED DESCRIPTION

Like parts or functionally like parts are designated by like reference numerals in the figures. Recurring parts are not designated separately in each figure.

Figure 1:
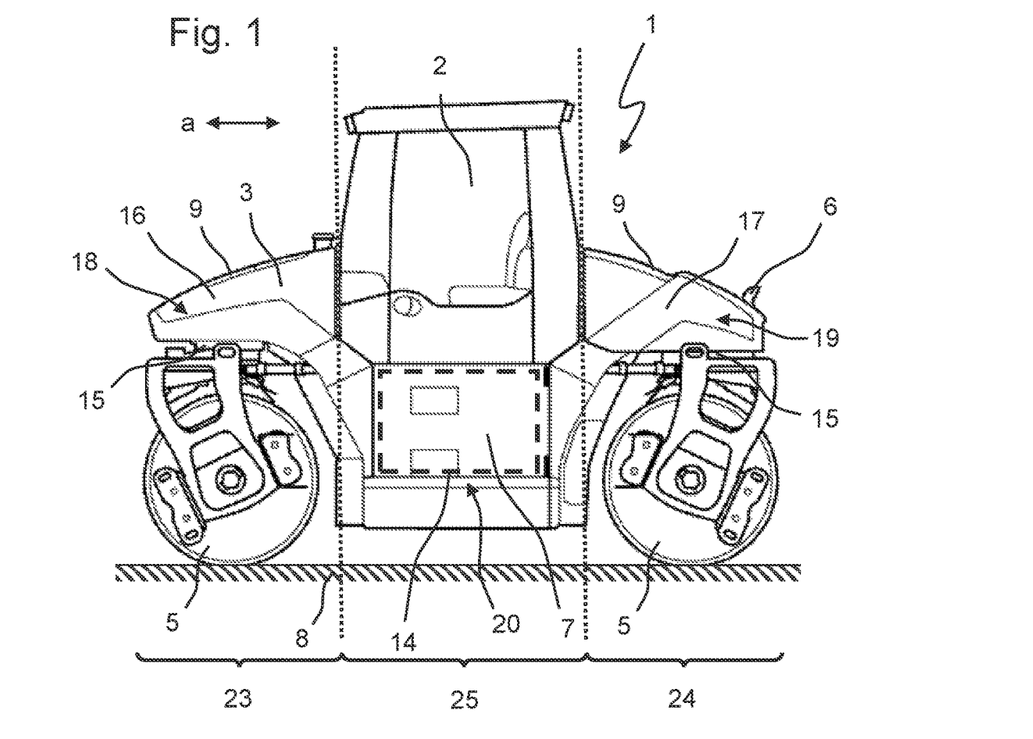
FIG. 1: is a side view of a generic tandem roller.

FIG. 1 shows a pivot-steered tandem roller 1. The tandem roller 1 has a machine frame 3 supported by two compaction drums 5. The compaction drums 5 are each mounted on the machine frame 3 for rotation about a vertical steering axis by means of a turntable 15. An operator platform 2 is arranged in the longitudinal direction of the machine a in the center of the machine, which includes, for example, the control elements of the tandem roller 1 and in which an operator is located during operation of the tandem roller 1. In working operation, the tandem roller 1 moves over and compacts the ground 8 in forward or reverse direction, which correspond to the longitudinal direction a of the machine without steering angle.

The side of the tandem roller 1 shown on the left in FIG. 1 is typically referred to as the front, while the side shown on the right is referred to as the rear, although the tandem roller 1 can work both forward and backward and has a comparatively symmetrical structure. For example, the basic structure of the tandem roller 1, and in particular its frame configuration, can be divided into a first steering section 23, a second steering section 24 and a drive and control section 25. The two steering sections 23, 24 each comprise a compaction drum 5 and a part of the machine frame 3. They include, for example, a front cover 16 and a rear cover 17, each at least partially encasing or enclosing a front machine compartment 18 and a rear machine compartment 19, respectively. Importantly, the front and rear steering sections 23 and 24 are configured such that a type of superstructure, comprising a part of the machine frame and a respective cover, is in each case provided above the respective compaction drum. The central drive and control section 25 is located between the two steering sections 23, 24. It includes the operator platform 2 and an engine compartment 20 located below the operator platform, which is limited on both sides transversely to the longitudinal direction a of the machine by an engine compartment door 7. Viewed in vertical direction, the engine compartment is located at the level of the front and rear compaction drums. Further, the engine compartment is located essentially vertically below the two superstructures described above or the interior spaces covered by the respective cover.

Liquid tanks 14, for example water tanks, may be accommodated in the engine compartment doors 7. The drive motor 4 (see FIGS. 2-6), which is configured, for example, as a diesel combustion engine and may include, for example, an exhaust gas aftertreatment device, in particular an SCR device 21, is located in the engine compartment 20 between the liquid tanks 14 and engine compartment doors 7.

Figure 2:
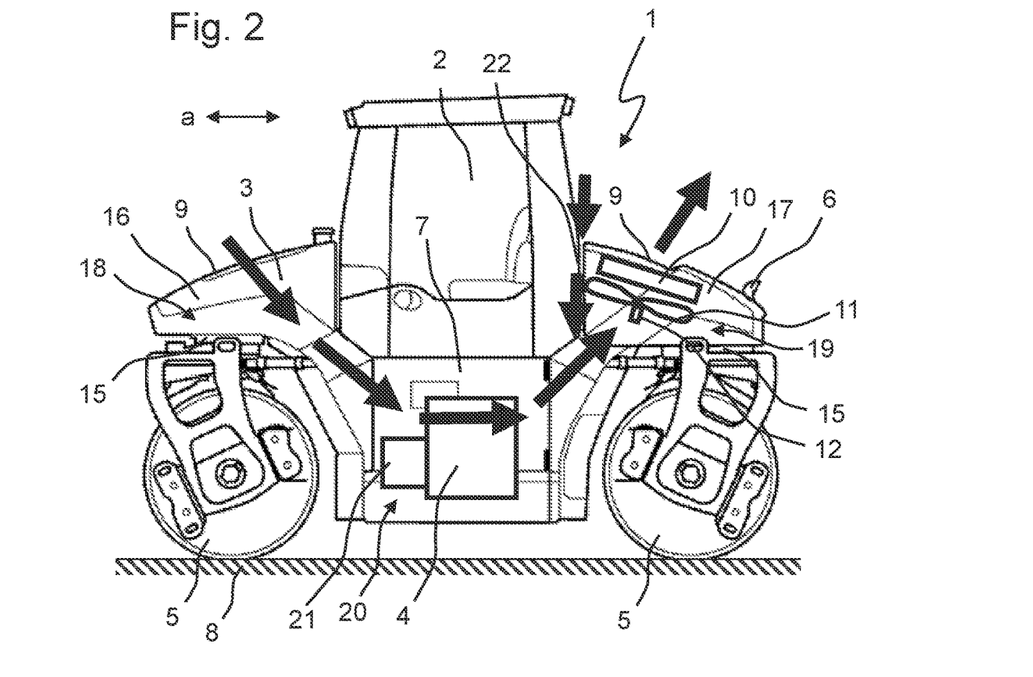
FIG. 2: shows one possibility to route cooling air through the tandem roller of FIG. 1.

A first embodiment example of a cooling solution according to the invention for the tandem roller 1 is shown in FIG.

2. As shown in the figure, the cooler 10, which is configured, for example, as a hydraulic oil cooler, water cooler or charge air cooler, or a combination of two or three of these coolers, is arranged in the rear machine compartment 19. Other coolers may also be provided, for example for an air conditioning system, etc. Due to the arrangement of the cooler 10 in the rear machine compartment 19, the cooler 10 does not have to be accommodated in the engine compartment 20 together with the drive motor 4, as is usually the case. In this manner, the space in the engine compartment 20 can be used by other components, such as the SCR device 21. At the same time, however, the cooler 10 can be configured with a sufficient size, since more space is available in the rear machine compartment 19 than in the engine compartment 20. Further, this allows particularly efficient cooling air routing, since a cooling air flow channel with significantly improved flow characteristics is obtained overall.

The black arrows in FIG. 2 indicate the flow direction of the cooling air within the machine frame 3 of the tandem roller 1. Initially, cooling air from the outside environment of the tandem roller 1 is drawn into the front machine compartment 18 through ventilation openings 9 on the vertically upper side of the front cover 16. From there, the cooling air is transported downward and rearward in the longitudinal direction of the machine a into the engine compartment 20. The cooling air flows through the latter essentially horizontally, i.e. rearward in the longitudinal direction of the machine a, and flows along the drive motor 4. From the engine compartment 20, the cooling air is then transported vertically upward and further rearward in the longitudinal direction a of the machine until it reaches the rear machine compartment 19. From there, the cooling air is then blown out through ventilation openings 9 in the rear cover 17 to the outside environment of the tandem roller 1. The cooling air flow or the conveyance of the cooling air is effected by the fan 11, which is driven, for example, by a separate fan drive 12, which in the embodiment example shown may be, for example, a hydraulic drive or an electric drive. The fan 11 is arranged together with the cooler 10 in the second ("rear") steering section 24, more specifically in the rear machine compartment 19. It draws the cooling air through the ventilation openings 9 in the first steering section 23 into the front machine compartment 18, from there into the machine compartment 20 in the drive and control section 25, there past the drive motor 4 and further rearward in the longitudinal direction a of the machine into the rear machine compartment 19. From there, the fan 11 blows the cooling air first through the cooler 10 and then through the ventilation openings 9 of the rear cover 17 into the outside environment of the tandem roller 1. In the embodiment example shown, the fan 11 is thus arranged upstream of the cooler 10 with respect to the flow direction of the cooling air. However, the cooling air route could also be configured such that the flow direction of the cooling air is exactly reversed, i.e. it is drawn in at the rear cover 17 and blown out at the front cover 16.

FIG. 2 also shows an optional supplement and/or alternative solution to the cooling solution described. Specifically, an intake duct 22 may be formed through which, in particular additional, cooling air passes into the cooling air channel and to the cooler 10 in a manner bypassing the engine compartment 20. The intake duct 22 is arranged in the rear or second steering section 24 and also extends, for example, through the rear cover 17 or in an area between the driver's cab and the rear cover 17. Due to the, in particular additional, cooling air supplied through the intake duct 22 and bypassing the engine compartment 20, the overall temperature of the cooling air flow is lowered, so that the cooling efficiency of the cooler 10 increases. According to another alternative embodiment, air routing through the front machine compartment 18 and the engine compartment 20 is completely omitted and a circuit is created solely via the intake duct 22 and the rear machine compartment 19. In this manner, particularly cool cooling air flows through the cooler 10, so that its efficiency is particularly high.

Figure 3:
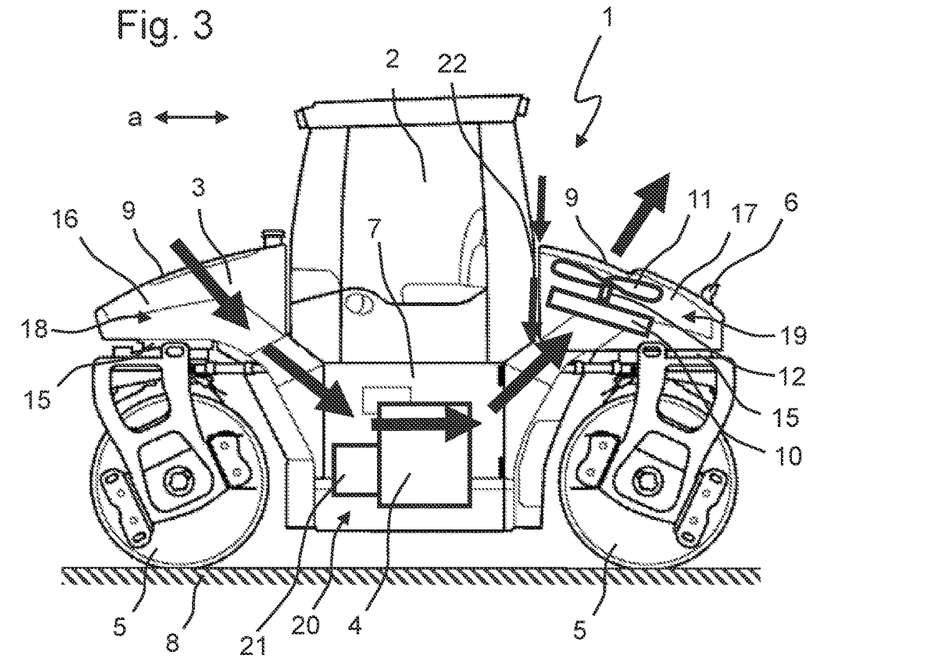
FIG. 3: shows another possibility to route cooling air through the tandem roller of FIG. 1.

FIG. 3 shows an alternative embodiment in which, in contrast to the embodiment of FIG. 2, the cooler 10 is arranged upstream of the fan 11 with respect to the flow direction of the cooling air. In other words, the fan 11 draws the cooling air through the cooler 10 and then blows it through the ventilation openings 9 of the rear cover 17 into the outside environment of the tandem roller 1. The fan 11 is in this case still arranged together with the cooler 10 in the rear machine compartment 19 and is operated by a separate fan drive 12. Compared to the embodiment of FIG. 2, this changes the order of the cooler 10 and the fan 11 with respect to the flow direction of the cooling air.

Figure 4:
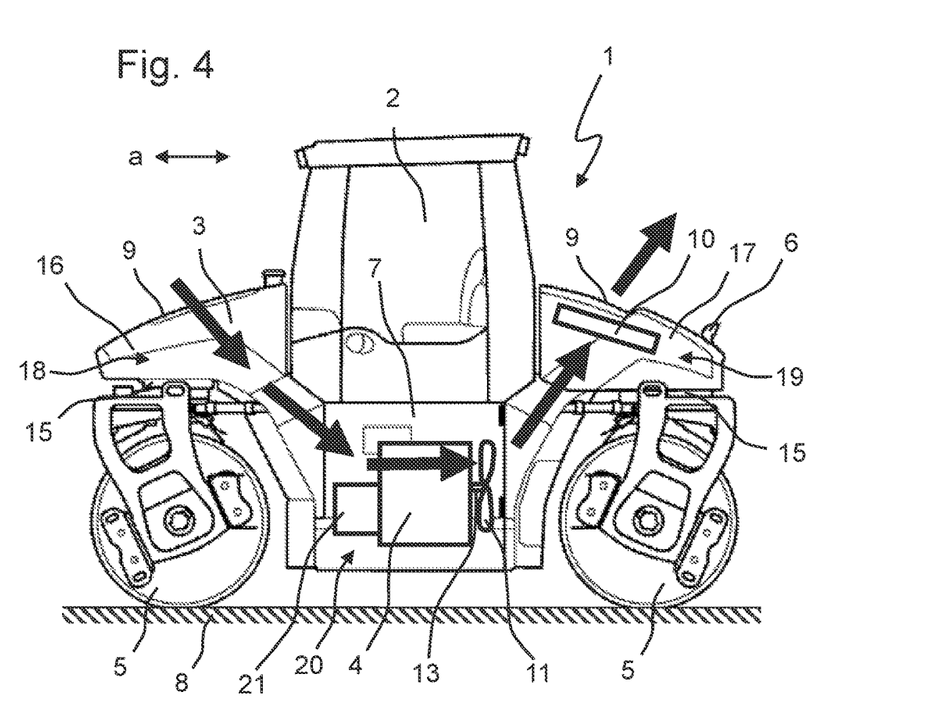
FIG. 4: shows another possibility to route cooling air through the tandem roller of FIG. 1.

In the further alternative embodiment of the invention according to FIG. 4, the cooler 10 and the fan 11 are no longer arranged in immediate proximity to each other and in a common interior compartment, as in the previous embodiments, but are locally separated from each other. More specifically, the fan 11 is arranged at a power take-off 13 of the drive motor 4 and is driven by the latter, for example via a belt drive. The fan 11 is therefore located in the drive and control section 25 of the tandem roller 1, more specifically in the engine compartment 20. The cooler 10, on the other hand, is still located in the rear machine compartment 19, i.e. outside the engine compartment 20. The air route corresponds to that of the previous embodiments. Incidentally, it is also possible in this regard to position the fan below the front cover and the cooler below the rear cover or vice versa.

In all of the embodiment examples of the invention shown, the flow direction of the cooling air may generally be reversed. However, it is advantageous if the cooling air is blown out in the same machine section as the exhaust gases of the combustion engine. Specifically, in the tandem rollers 1 shown in the figures, a tail pipe 6 of the exhaust gas system of the tandem roller 1 is arranged in the second steering section 24, in other words the rear machine section. Exhaust gases from the drive motor 4 are discharged from the tail pipe 6 into the outside environment of the tandem roller 1. The tail pipe 6 also directs the exhaust gases through the rear cover 17, for example. As shown in the figures, the rear cover 17 slopes away from the operator platform 2 and vertically downward. Due to the use of the SCR device, the tail pipe 6 may be configured without a rear muffler and therefore particularly short. In addition, the tail pipe 6 is configured such that the exit opening for the exhaust gases is located vertically below or at a maximum at the same height as the ventilation openings 9 through which the cooling air exits the machine compartment 19. The corresponding ventilation openings 9, on the other hand, are arranged closer to the operator platform 2 than the tail pipe 6. In other words, the ventilation openings 9 are located between the operator platform 2 and the tail pipe 6. According to an alternative embodiment, the tail pipe 6 may also be surrounded on both sides by the ventilation openings 9, in particular as seen in and/or transverse to the longitudinal direction a of the machine. The fan 11, the cooler 10 and the ventilation openings 9 through which the cooling air exits into the outside environment of the tandem roller 1 are configured such that the cooling air is blown out in a direction away from the operator platform 2 and obliquely upward. The tail pipe 6 is likewise configured such that the exhaust gases exit from the tail pipe 6 in this direction. In this manner, the exiting cooling air forms a flow carpet which is located between the operator platform 2 and the tail pipe 6 and therefore shields the driver of the tandem roller 1 from the exhaust gases. Due to the higher volume flow and the higher velocity of the exiting cooling air compared to the exhaust gas flow, the exhaust gases are in this manner also captured by the exiting cooling air flow and transported further away from the operator platform 2 and distributed in the outside environment. This also leads to a lower exhaust gas exposure for the driver of the tandem roller 1.

Figure 5:
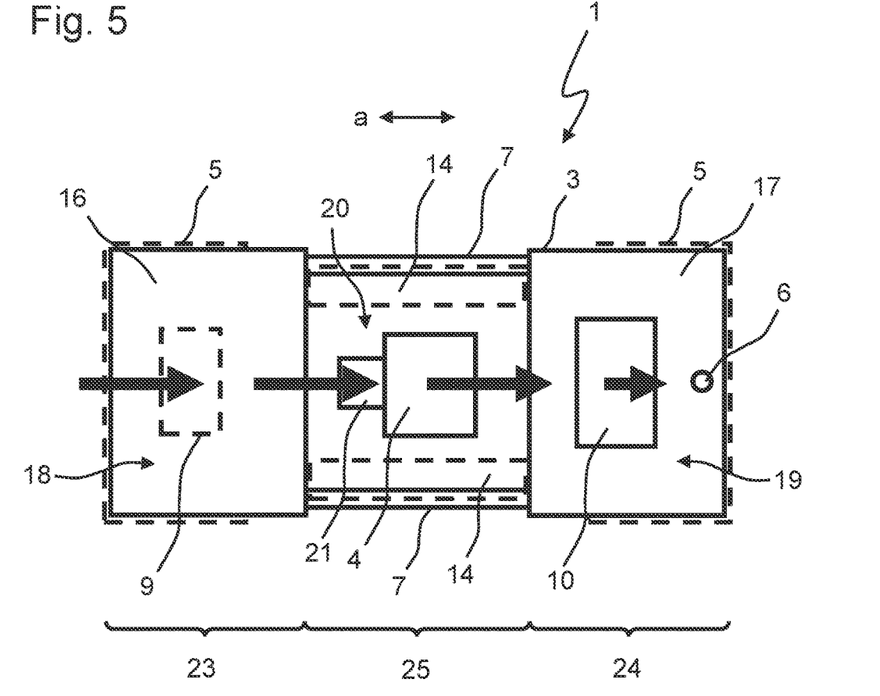
FIG. 5: is a top view of a possible cooling air route.
Figure 6:
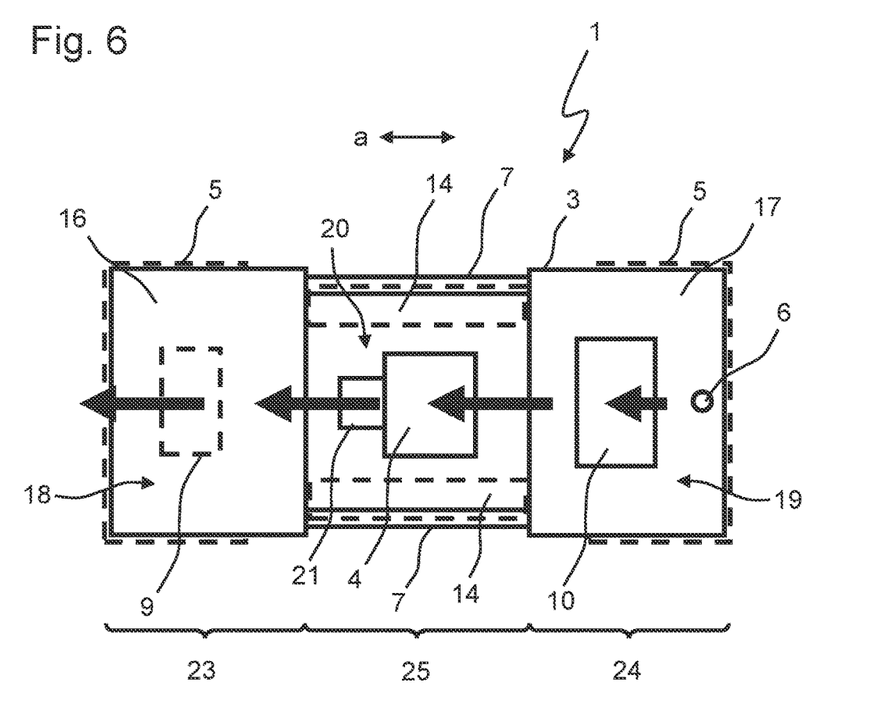
FIG. 6: is a top view of another possible cooling air route.

The routing of the cooling air according to the invention is also shown again in FIGS. 5 and 6. These figures each show a top view of the tandem roller 1, with the operator platform 2 omitted for clarity. FIGS. 5 and 6 illustrate in particular how the cooling air is guided through the tandem roller 1 via the first steering section 23, the drive and control section 25 and the second steering section 24. For example, a synopsis of FIGS. 1 and 5 illustrates how the two liquid tanks 14 arranged on the engine compartment doors 7 are arranged. They are located on opposite sides of the tandem roller 1 and can be swiveled with the engine compartment doors 7. By arranging the liquid tanks 14 in this manner, the center of gravity of the tandem roller 1 is particularly low when the liquid tanks 14 are filled, which is advantageous for reasons of stability. Moreover, the liquid tanks 14 can be conveniently refilled by an operator standing on the ground 8. Now, a key aspect of the invention is that an increase in size of the cooler 10 is not achieved by reducing the size of the liquid tanks 14 but by an arrangement of the cooler 10 outside the engine compartment 20, more specifically in one of the machine compartments 18, 19. In this manner, only the cooling air flow has to be directed through the engine compartment 20, in particular between the liquid tanks 14. A comparatively small gap between the drive motor 4 and the liquid tanks 14 is sufficient for this purpose. The flow through the cooler 10 itself then takes place in another region of the tandem roller 1. FIG. 6 further shows by way of example that a reverse flow of cooling air through the tandem roller 1 may generally also be used.

Figure 7:
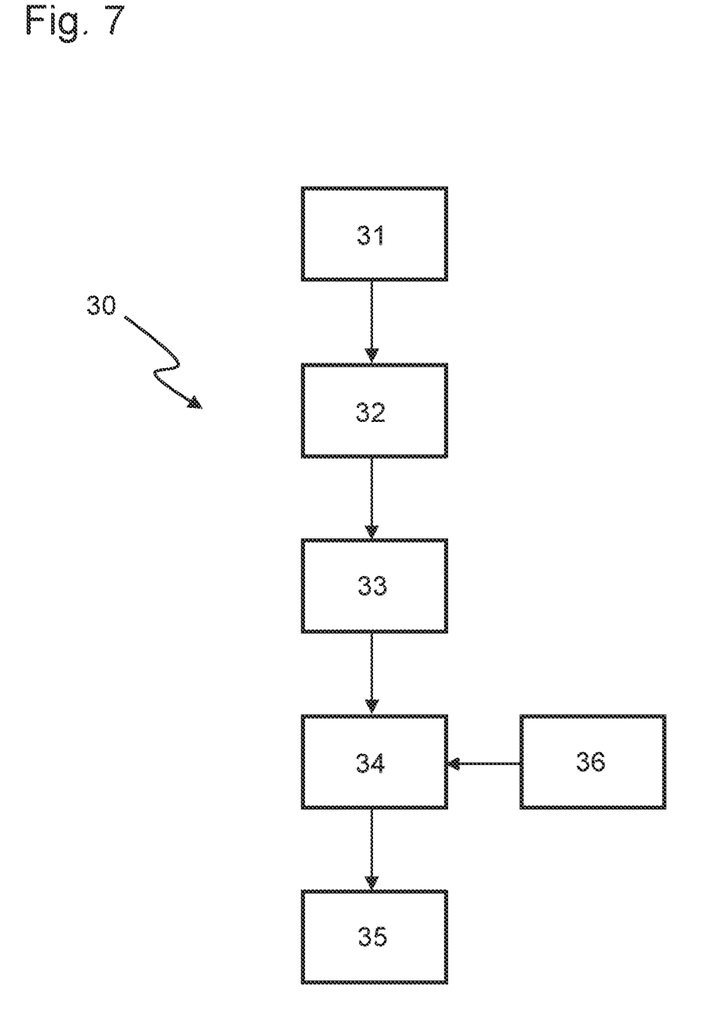
FIG. 7: is a flow chart of the method.

FIG. 7 shows a flow chart of the method 30 according to the invention. The method 30 starts with drawing 31 cooling air from the outside environment of the tandem roller 1 into a front or rear machine compartment 18, 19, preferably into the front machine compartment 18. The method then proceeds with directing 32 the cooling air downward into the engine compartment 20 and along the longitudinal axis a of the machine, preferably to the rear. This is followed by directing 33 the cooling air upward, and preferably rearward in the longitudinal direction a of the machine, into the respective other front or rear machine compartment 18, 19, preferably the rear machine compartment 19. This is followed by passing 34 the cooling air through a cooler 10 arranged in the front or rear machine compartment 18, 19, preferably in the rear machine compartment 19, and finally by blowing out 35 the cooling air into the outside environment of the tandem roller 1. Optionally, additional drawing in 36 of cooling air may be performed through an intake duct 22 between the operator platform 2 and ventilation openings 9 through which the cooling air flow conveyed by the fan 11 exits into the outside environment of the tandem roller 1. Also in the method 30 according to the invention, the cooling air may be blown out 35 in such a way that it is directed towards the exit of the exhaust gas from the tail pipe 6 of the exhaust gas system and therefore transports these exhaust gases away from the operator platform 2 and actively mixes them with the air of the outside environment.

Overall, the invention makes optimum use of the installation space of the tandem roller 1, in particular in the interior of the machine compartments 18, 19 and the engine compartment 20. This makes it possible to configure multiple components of the tandem roller 1, for example the cooler 10 and the liquid tanks 14, with the largest possible volume and therefore increase the efficiency of the machine. In addition, the invention allows the cooling air flow to be used advantageously to protect the driver of the tandem roller 1 from exhaust gases from the machine.

What is claimed is:

1. A pivot-steered tandem roller machine for ground compaction, comprising:
   a machine frame with an operator platform;
   two compaction drums spaced apart in a longitudinal direction of the tandem roller machine, each of which is steerably mounted on the machine frame via a pivot steering system;
   a drive motor;
   a cooler;
   a fan associated with the cooler and to convey a cooling air flow;
   wherein the cooler is arranged vertically above and/or in the longitudinal direction of the tandem roller machine at a level of one of the compaction drums;
   wherein a machine compartment which is at least partially encased by a cover is provided both in front of and behind the operator platform in the longitudinal direction of the tandem roller machine, the front cover and the rear cover having ventilation openings on a vertically upper side, respectively, for the cooling air flow conveyed by the fan; and
   wherein a flow channel is provided which is configured such that the cooling air flow conveyed by the fan is conveyed from an outside environment of the tandem roller machine into the front machine compartment, and from there vertically downward and rearward into an engine compartment arranged below the operator platform, then horizontally through the engine compartment, from there vertically upward and rearward into the rear machine compartment and from there back into the outside environment of the tandem roller machine, or vice versa.

2. The tandem roller machine according to claim 1, wherein the cooler is arranged vertically above a turntable of the pivot steering system of one of the compaction drums.

3. The tandem roller machine according to claim 1, wherein the cooler is configured as a cooler package and comprises at least two of a hydraulic fluid cooler, a coolant cooler and a charge air cooler.

4. The tandem roller machine according to claim 1, wherein the fan associated with the cooler has at least one of the following features:
   the fan is arranged vertically above and/or in the longitudinal direction of the tandem roller machine at the level of one of the compaction drums;
   the fan is arranged at a power take-off of the drive motor;
   the fan is arranged upstream of the cooler in a flow direction of the cooling air and blows the cooling air through the cooler;
   the fan is arranged downstream of the cooler in a flow direction of the cooling air and draws the cooling air through the cooler; and the fan is drivable by a separate hydraulic fan drive or electric fan drive, or by a power take-off of the drive motor, wherein the power take-off is a belt drive.

5. The tandem roller machine according to claim 1, wherein the cooler is arranged in the front machine compartment or in the rear machine compartment, and that the fan associated with the cooler is arranged in the front machine compartment or in the rear machine compartment.

6. The tandem roller machine according to claim 1, wherein the engine compartment is limited on both sides transversely to the longitudinal direction of the tandem roller machine by a respective engine compartment door, the engine compartment doors each having a liquid tank, and that the cooling air flow conveyed by the fan is passed through between the two liquid tanks, the cooler being arranged outside a region located between the two liquid tanks.

7. The tandem roller machine according to claim 1, wherein an intake duct through which air is drawn in from an outside environment of the tandem roller machine and added to the cooling air flow is arranged between the operator platform and the ventilation openings through which the cooling air flow conveyed by the fan exits into the outside environment of the tandem roller machine.

8. The tandem roller machine according to claim 1, wherein the cooler is arranged such that the cooling air flow conveyed by the fan flows through the cooler in an oblique upward direction and away from the operator platform.

9. The tandem roller machine according to claim 1, wherein the ventilation openings through which the cooling air flow conveyed by the fan exits into an outside environment of the tandem roller machine are configured such that the cooling air flow conveyed by the fan is directed in an oblique upward direction and away from the operator platform when exiting through the ventilation openings.

10. The tandem roller machine according to claim 1, wherein the ventilation openings through which the cooling air flow conveyed by the fan exits into an outside environment of the tandem roller machine and a tail pipe of an exhaust gas system of the drive motor are arranged on a same cover, and that the ventilation openings are arranged at least partially closer to the operator platform than the tail pipe.

11. The tandem roller machine according to claim 1, wherein the cooler is arranged such that the cooling air flow flows through the cooler in an at least partially upward direction.

12. A method for operating a pivot-steered tandem roller machine, comprising:
drawing in cooling air from an outside environment of the tandem roller machine into a front machine compartment or a rear machine compartment;
directing the cooling air downward into an engine compartment and along a longitudinal direction of the tandem roller machine;
directing the cooling air upward into the respective other front machine compartment or rear machine compartment;
passing the cooling air through a cooler arranged in the front machine compartment or the rear machine compartment;
blowing out the cooling air into the outside environment of the tandem roller machine; and
drawing in the cooling air through an intake duct between an operator platform and ventilation openings through which a cooling air flow conveyed by a fan exits into the outside environment of the tandem roller machine.

13. The method according to 12, wherein the cooling air is drawn in obliquely downward and/or the cooling air is passed through obliquely upward and/or the cooling air is blown out obliquely upward and away from an operator platform.

14. The method according to 12, wherein the cooling air is blown out into the outside environment of the tandem roller machine such that the cooling air flow is directed toward a tail pipe of an exhaust gas system of a drive motor.

15. The method according to claim 12, wherein the pivot-steered tandem roller machine comprises:
a machine frame with an operator platform;
two compaction drums spaced apart in a longitudinal direction of the machine, each of which is steerably mounted on the machine frame via a pivot steering system;
a drive motor;
a cooler;
a fan associated with the cooler and to convey a cooling air flow; and
wherein the cooler is arranged vertically above and/or in the longitudinal direction of the machine at a level of one of the compaction drums.

16. A pivot-steered tandem roller machine for ground compaction, comprising:
a machine frame with an operator platform;
two compaction drums spaced apart in a longitudinal direction of the tandem roller machine, each of which is steerably mounted on the machine frame via a pivot steering system;
a drive motor;
a cooler;
a fan associated with the cooler and to convey a cooling air flow;
wherein the cooler is arranged vertically above and/or in the longitudinal direction of the tandem roller machine at a level of one of the compaction drums; and
wherein the cooler is arranged such that the cooling air flow flows through the cooler in an at least partially upward direction.

* * * * *